April 2, 1940.                G. TODD                2,195,661
                             CONVEYER
                        Filed Sept. 2, 1937        11 Sheets-Sheet 1
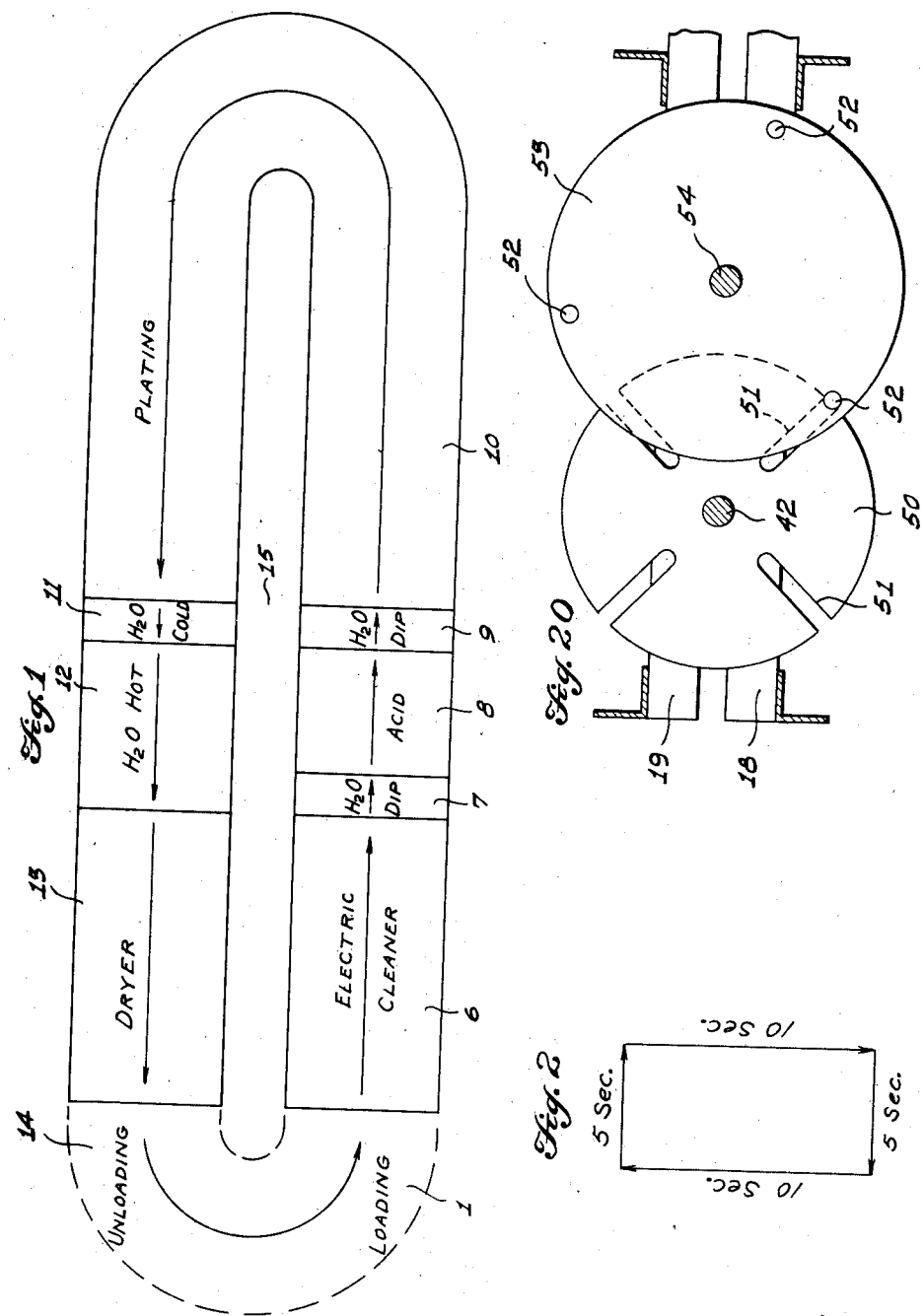
Inventor
GUERIN TODD
By
        Attorneys April 2, 1940.　　　　　G. TODD　　　　　2,195,661
CONVEYER
Filed Sept. 2, 1937　　　11 Sheets-Sheet 2
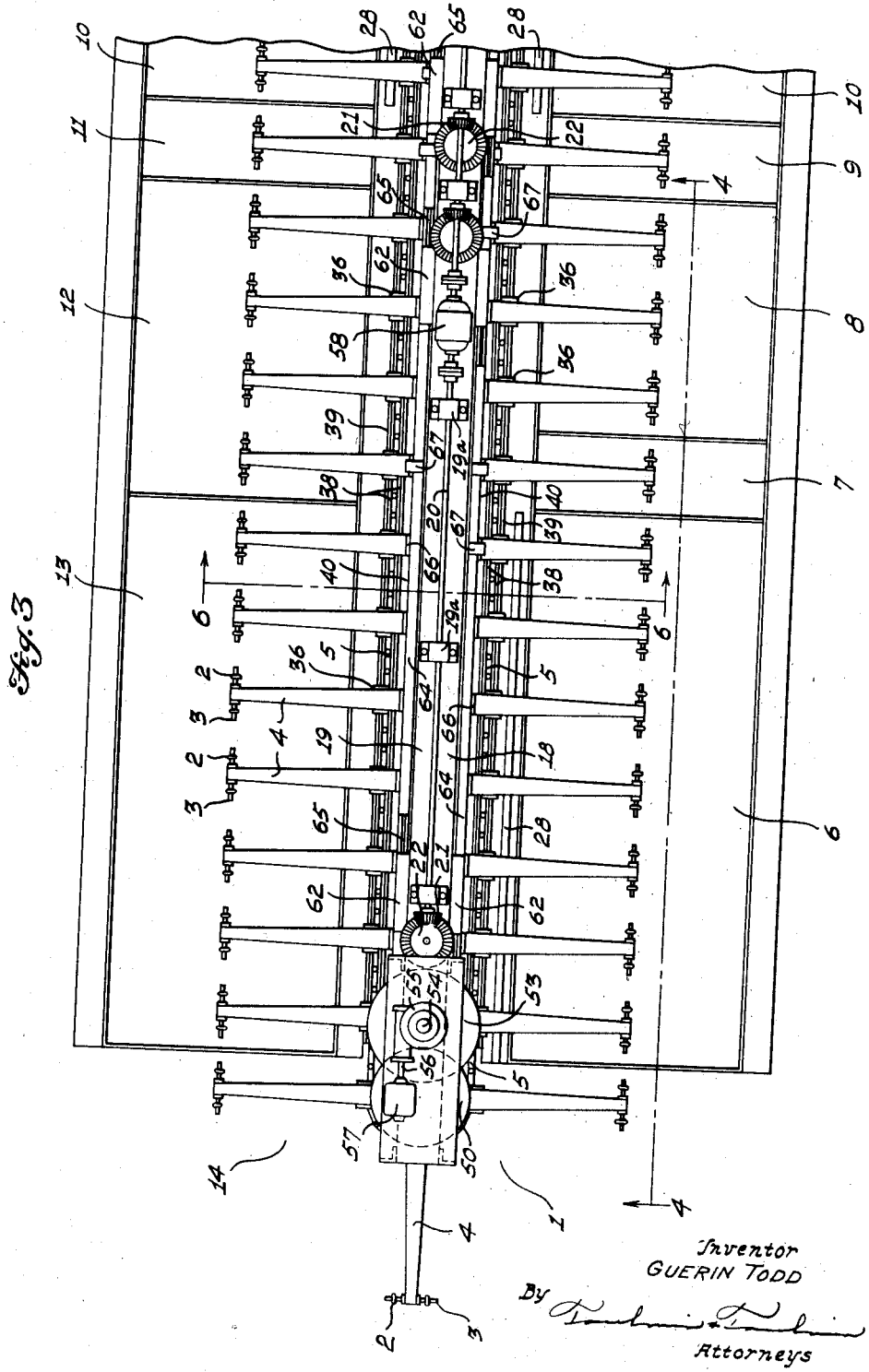

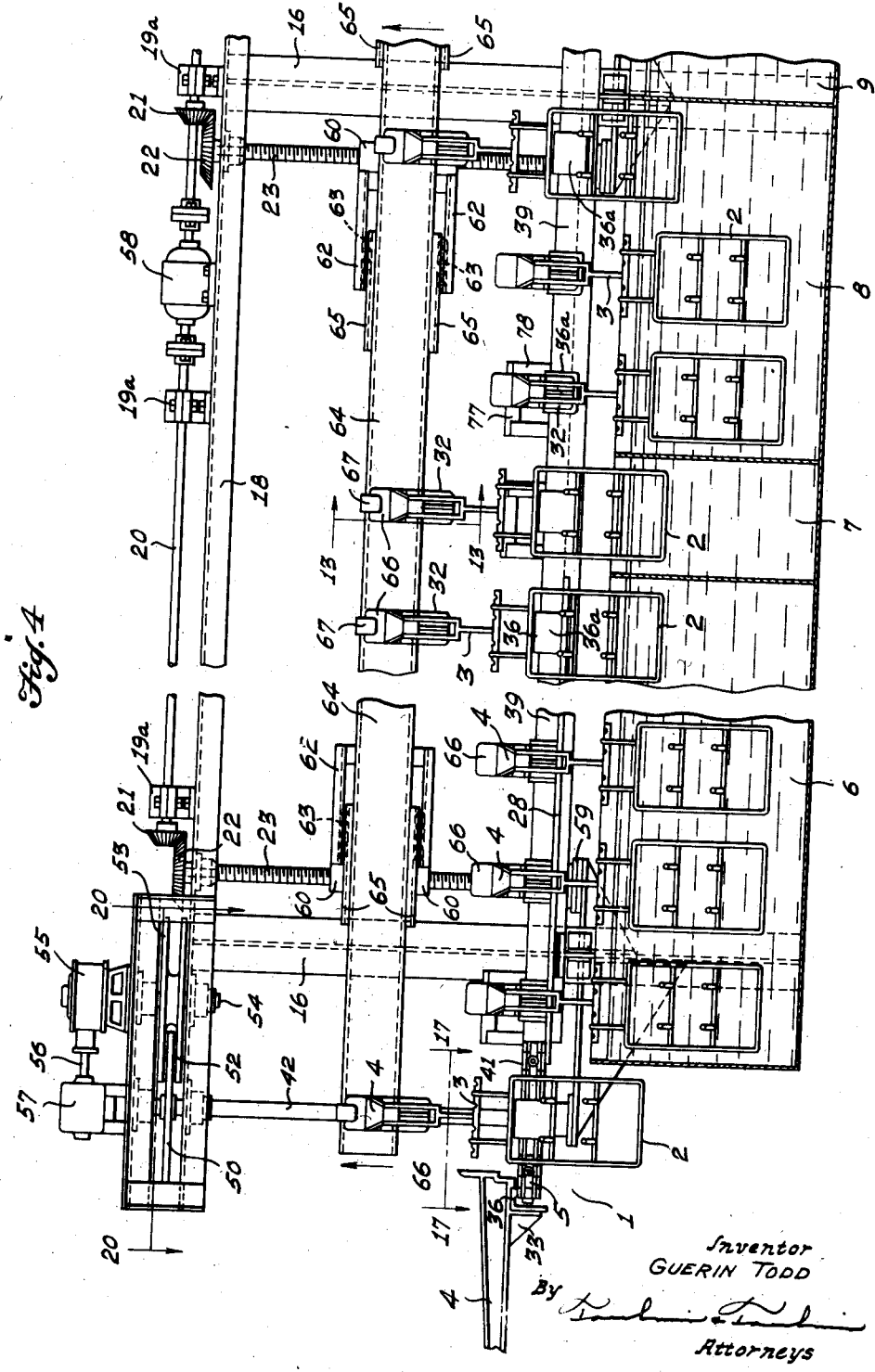

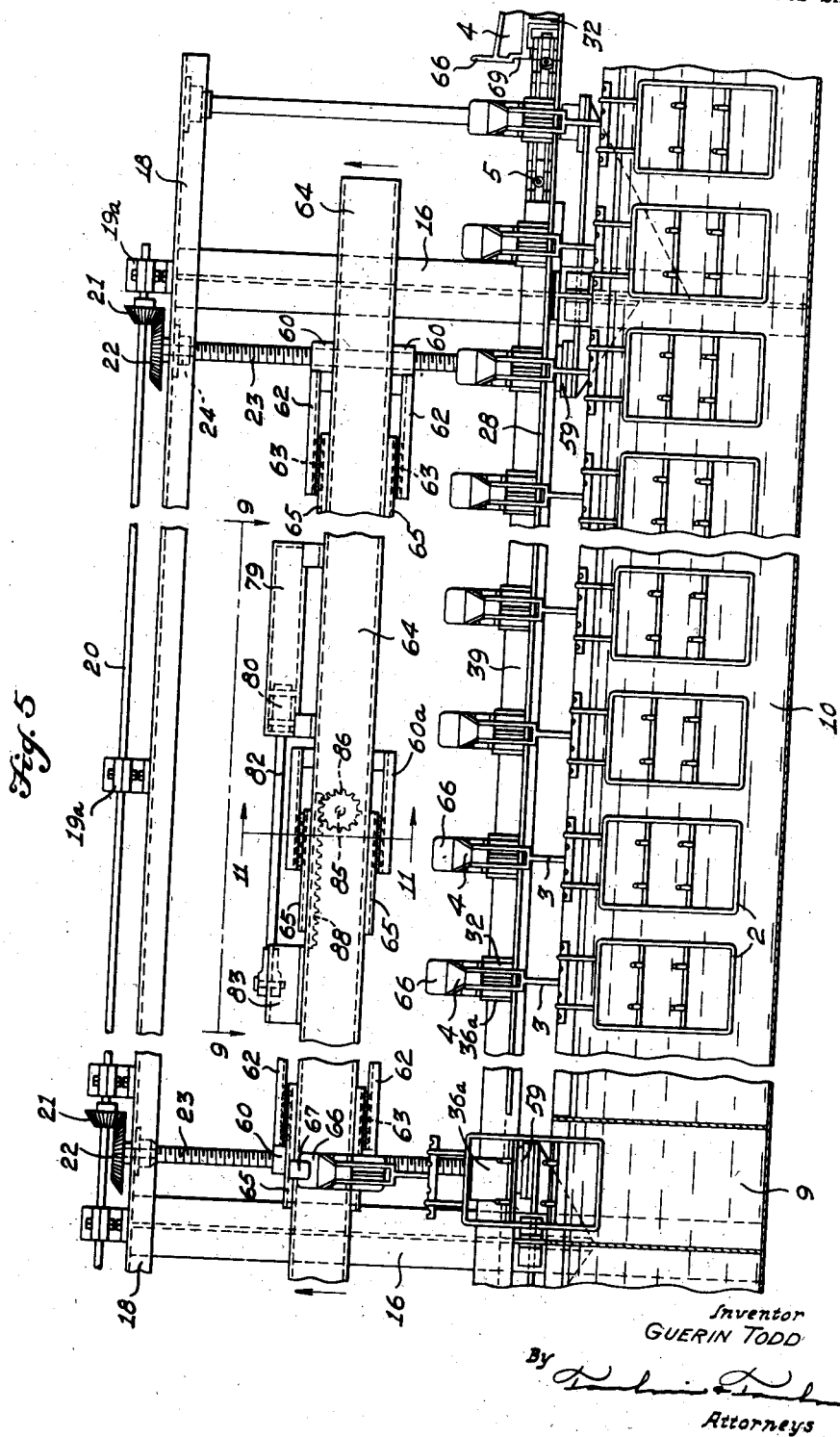

April 2, 1940.　　　　　G. TODD　　　　　2,195,661
CONVEYER
Filed Sept. 2, 1937　　　11 Sheets-Sheet 5
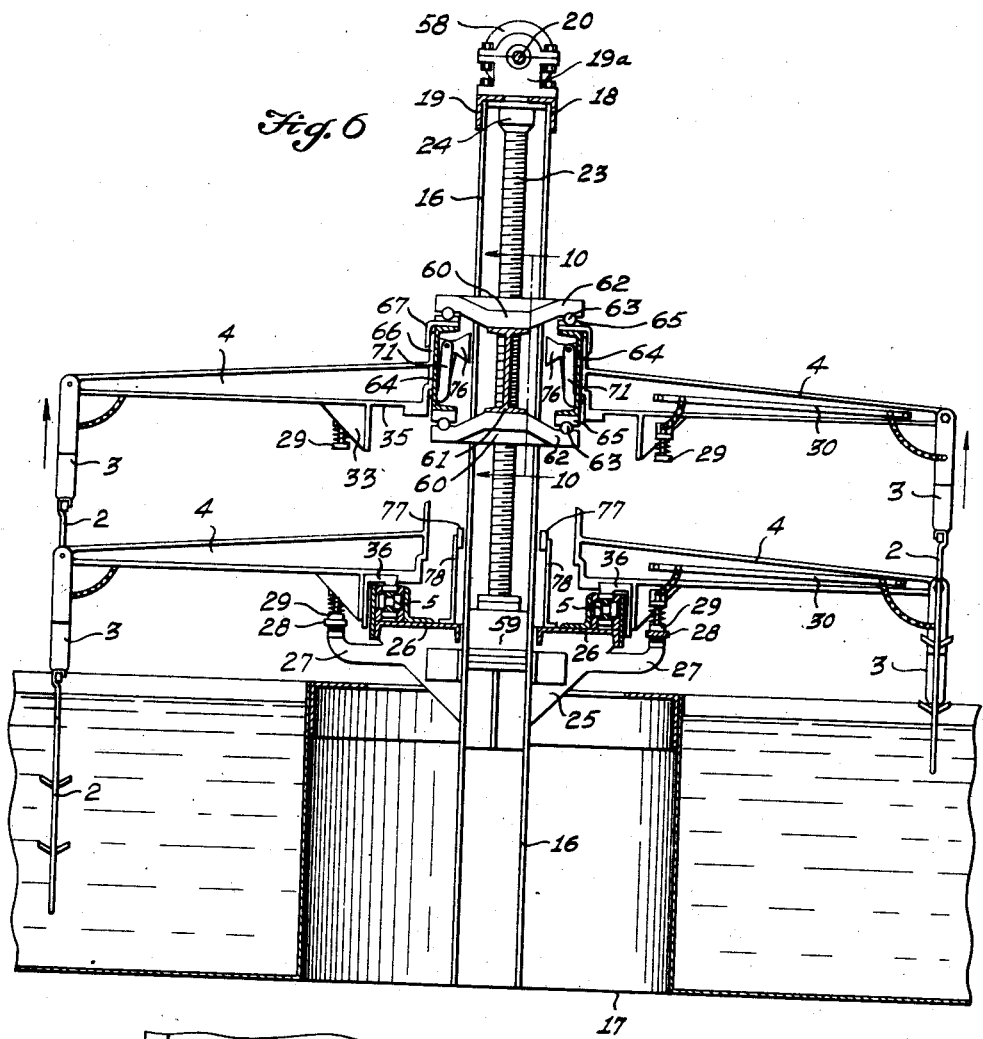
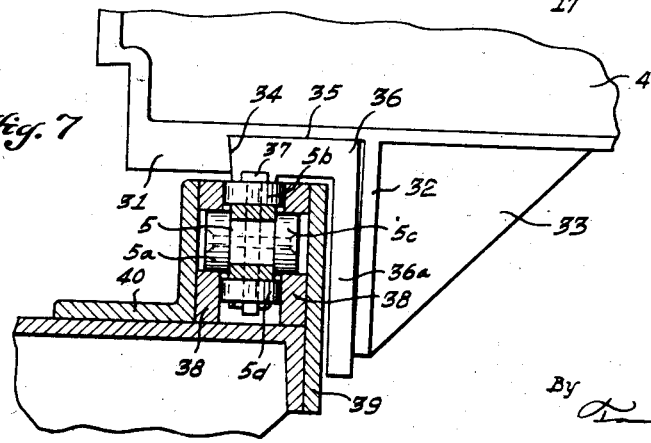
Inventor
GUERIN TODD
By
Attorneys April 2, 1940.  G. TODD  2,195,661
CONVEYER
Filed Sept. 2, 1937   11 Sheets-Sheet 6
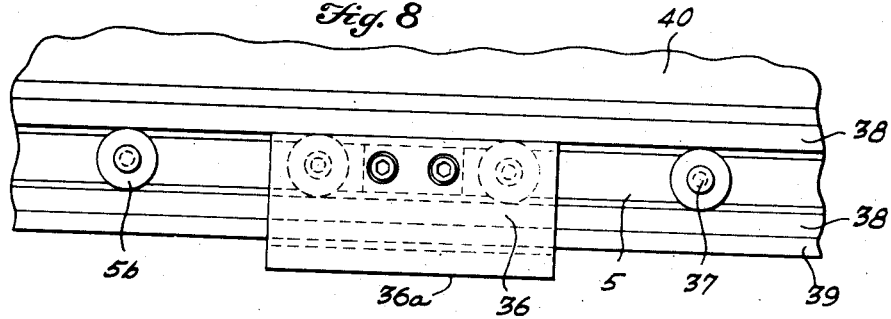
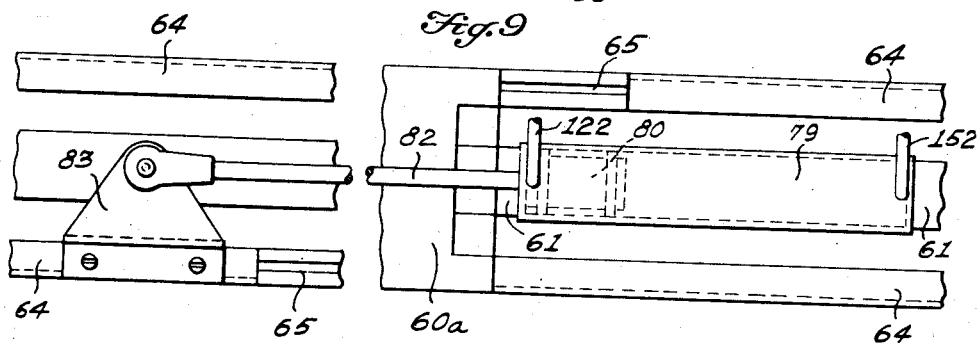
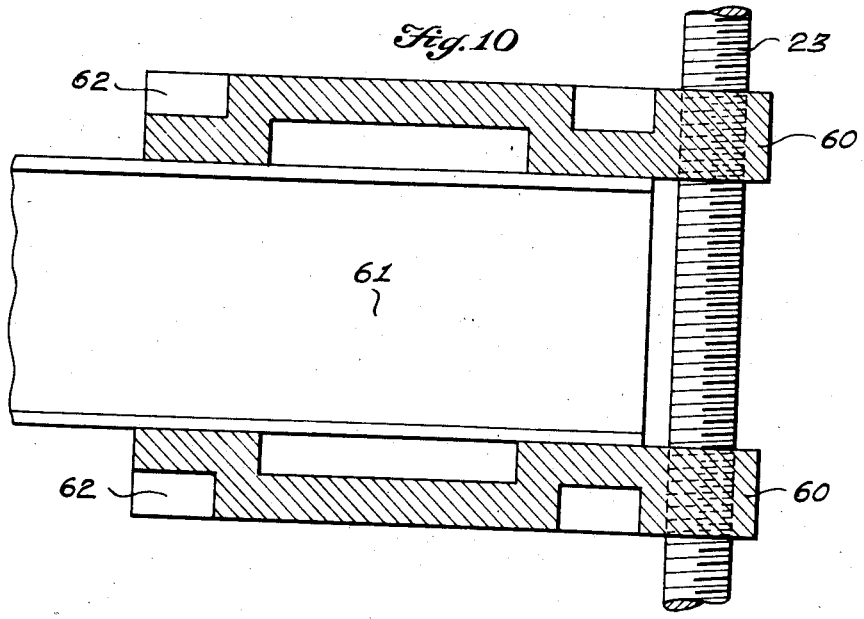
Inventor
GUERIN TODD
By
Attorneys April 2, 1940.  G. TODD  2,195,661
CONVEYER
Filed Sept. 2, 1937   11 Sheets-Sheet 7

Inventor
GUERIN TODD
By
Attorneys

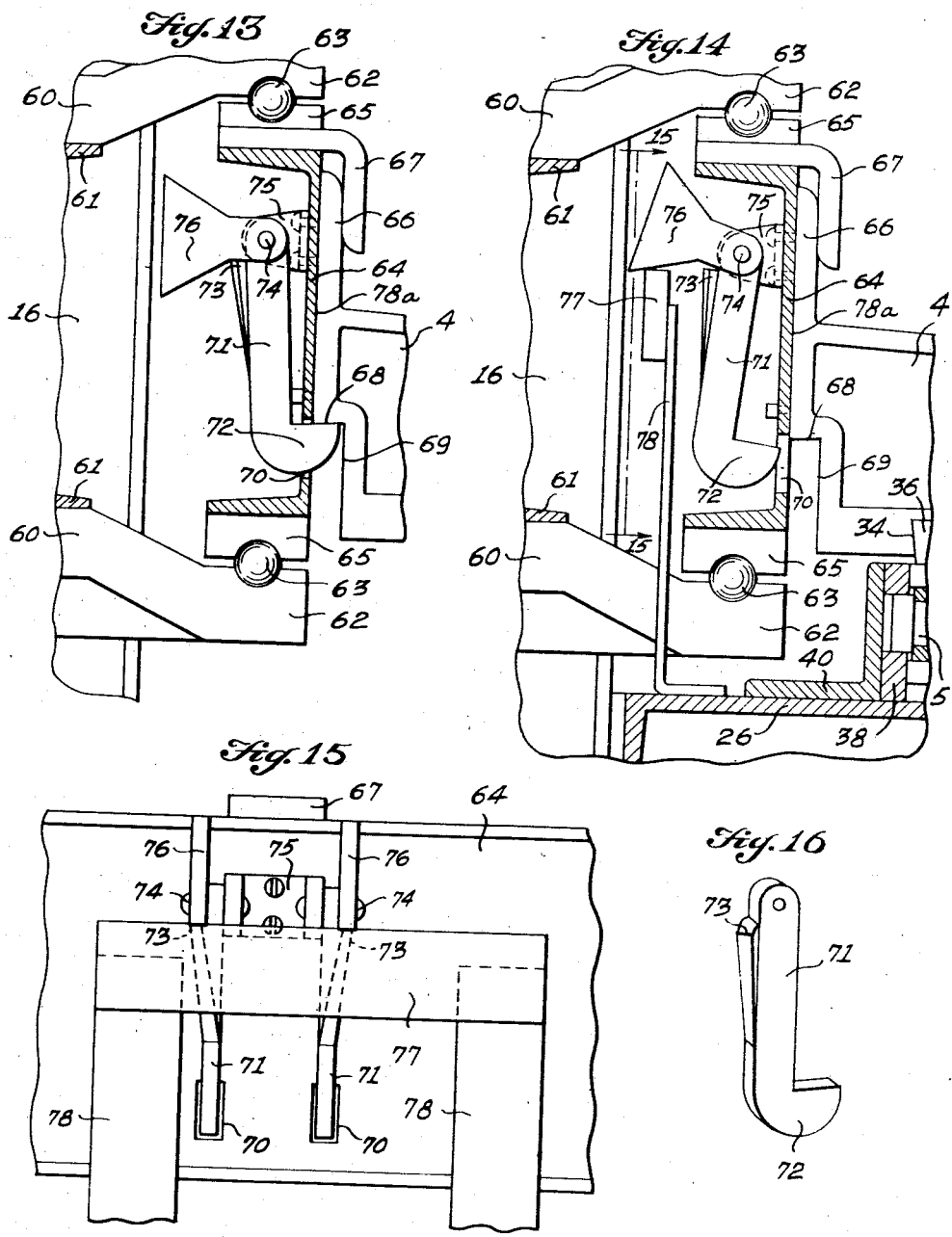

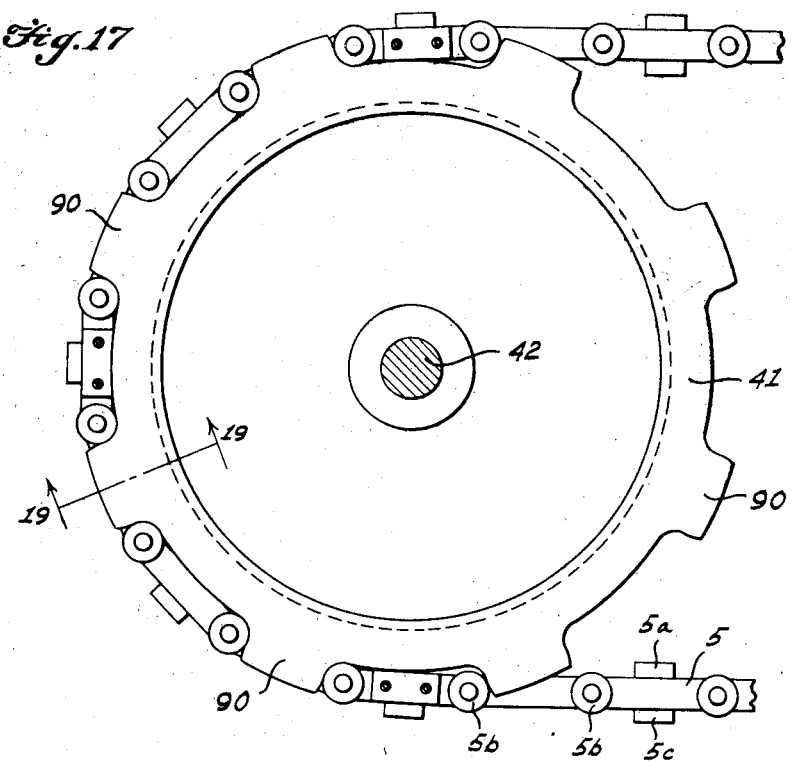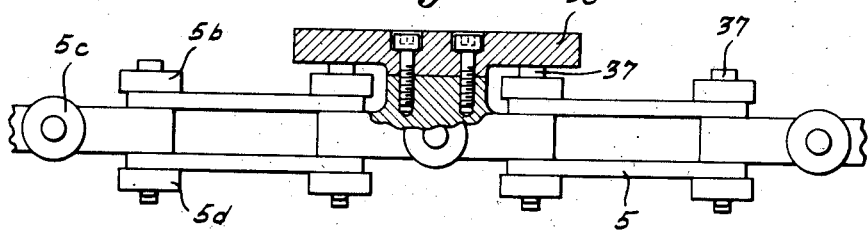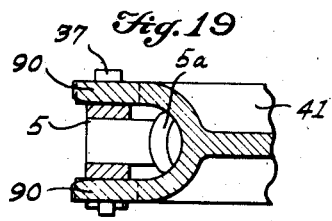

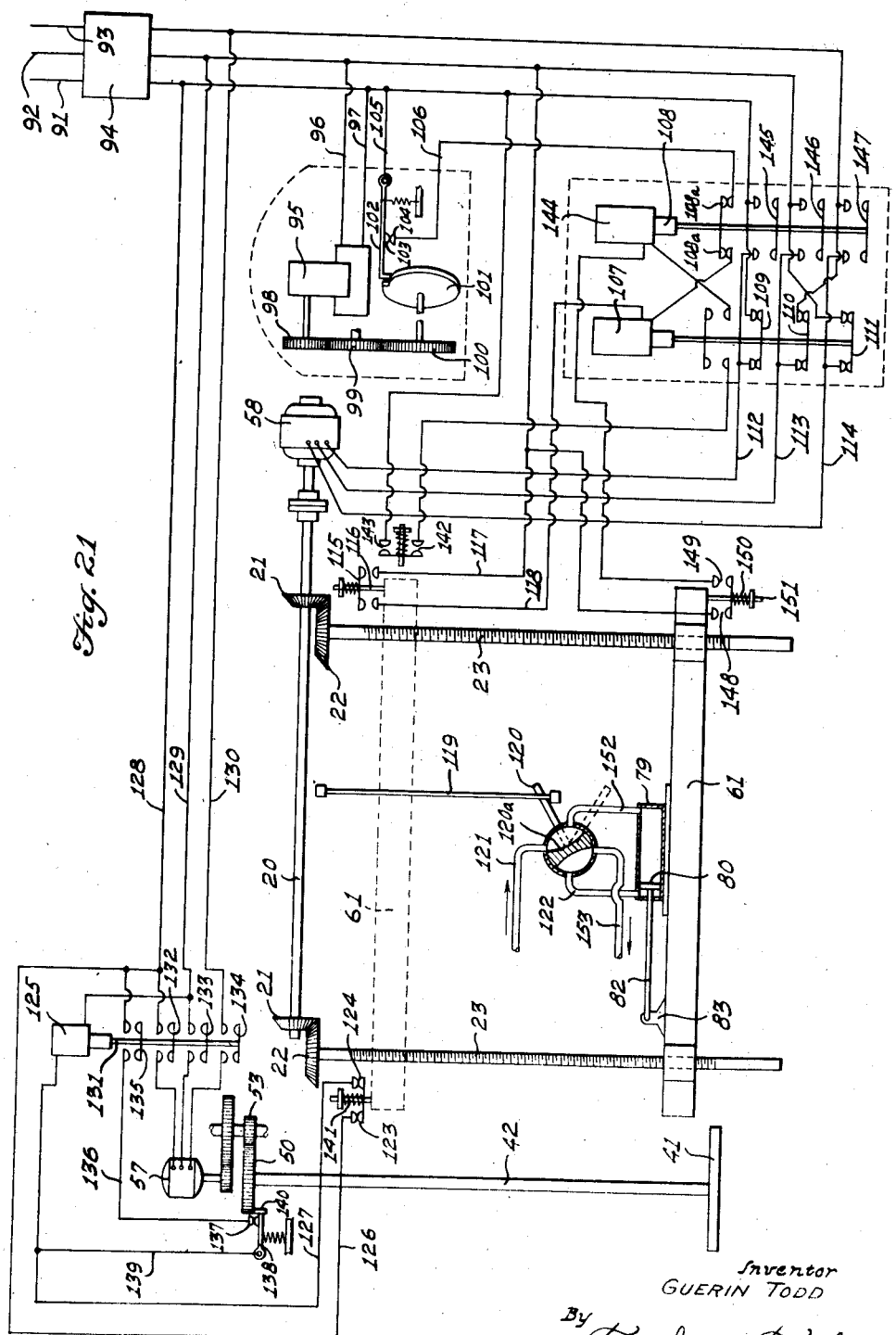

April 2, 1940.  G. TODD  2,195,661
CONVEYER
Filed Sept. 2, 1937   11 Sheets-Sheet 11
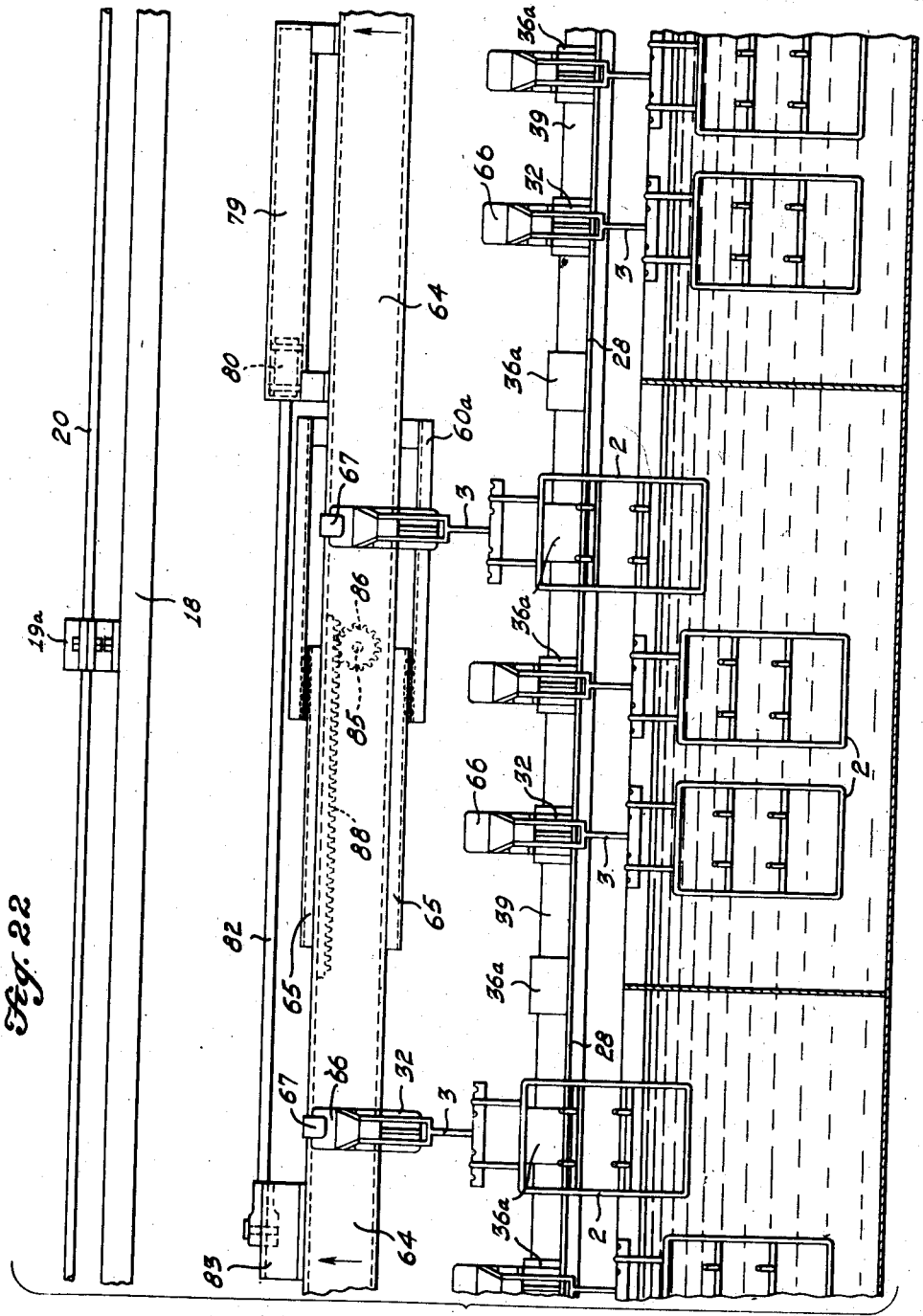
Inventor
GUERIN TODD
By
Attorneys Patented Apr. 2, 1940

2,195,661

UNITED STATES PATENT OFFICE 2,195,661

CONVEYER

Guerin Todd, Shrewsbury, N. J., assignor to Hanson-Van Winkle-Munning Company, Matawan, N. J., a corporation of New Jersey Application September 2, 1937, Serial No. 162,180

27 Claims. (Cl. 214—17)

This invention relates to an electro-processing machine.

It is an object of the invention to provide a means and method of handling a plurality of side arms in such a manner that they can be transported transversely of the machine elevated rapidly, transported horizontally rapidly and lowered rapidly to an advance position on the main carrier chain while at the same time preserving said arms in their same horizontal position. By eliminating rocking side arms and always maintaining the side arms in the same horizontal position, it is possible to carry a greater number of racks and loads within a given width of a tank or it is possible to utilize a narrower tank.

It is a further object of this invention to reduce the overall height of electroprocessing machines so that they can be installed in buildings where there is a minimum of headroom.

It is a further object of this invention to eliminate pivoted side arms, lifting cams and similar mechanisms that are not only expensive to install, operate and maintain but also which limit the flexibility of the machine in adapting it to different cycles of operation and different schedules of treatment of the work pieces.

By employing the construction and method of operation of this invention it is possible to vary the relative position and number of side arms in order to have flexibility in the operation of the machine.

It is a further object of the invention to provide on a central column between tanks or on a column located at one side of a tank all of the operating mechanism for transporting and transferring carrier arms and all the mechanism of electrical character. By so arranging the mechanism it is possible to prevent any grease or other foreign materials from dropping into the tanks. All obstructions to reaching the work pieces, racks and the like from the outside of the tanks are thus removed.

It is an object of the invention to provide a common carrier chain, a plurality of horizonally disposed rigid carrier arms and a transfer mechanism consisting of an elevating frame called an "elevator" which picks up one or more arms. This "elevator" is provided with trackways and a car or shifter running upon the trackways and detachably attached to one or more of the side arms for picking up the arm or arms and transporting the arm or arms horizontally. This movement is effected according to the object of the invention by any desired means but preferably hydraulically or pneumatically.

It is a further object to so arrange this elevating and horizontal transporting mechanism that while the car transporting an arm or arms in one direction on one side of the machine is operating, it is simultaneously interconnected with and the same operating means operates an oppositely disposed car carrying an arm traveling in the opposite direction, or said car may travel without an arm in the process of being restored to its original pick-up position.

In other words, it is an object of this invention to provide an elevator, a horizontal transporting means traveling in opposite directions on opposite sides simultaneously so that when the horizontal transporting means is moving in one direction the oppositely disposed means will be moving in the opposite direction and there is a common actuating means for both cars. If desired, of course, cars on opposite sides could travel in the same direction as in the case of a common actuating means between parallel tanks in which the arms and work pieces were traveling in the same direction.

It is an object of the invention to provide a cycle of operations in which the main carrier chain moves a plurality of arms with racks and work pieces in the solutions in the tanks, said chain moving relatively slowly. Elevators are provided for raising and lowering the transporting tracks in order to get quick transfer for quick elevation and quick lowering adjacent tank ends, and the means heretofore indicated, such as a car pneumatically or hydraulically operated or even electrically operated, transports the arms horizontally rapidly to lowering position by the elevator. Thus this rectangular transfer movement of a rigid horizontally disposed side arm with vertically depending work racks can be effected with the maximum speed and with perfect timing.

It is a further object to provide a synchronous system for controlling the movement of the main carrier chain and for controlling the elevating transporting and lowering movements for the quick transfers.

It is a further object to provide a step by step movement of the main carrier chain in timed synchronism with the transfer mechanism operation.

Referring to the drawings,

Figure 1 is a diagrammatic plan view of a typical plating cycle. It is to be understood that any arrangement of tanks and plating cycle may be employed.

Figure 2 is a diagrammatic illustration of the transfer cycle. It will be understood that any timing may be employed that is desired.

Figure 3 is a top plan view of the left hand end of the complete machine.

Figure 4 is a side elevation with the tanks in section of the left hand end of the machine. The section line through the tanks is on the line 4—4, looking in the direction of the arrows, of Figure 3.

Figure 5 is a detail elevation with the tanks in section and with a portion of the machine partially broken away showing the operation of the transfer mechanism.

Figure 6 is a section on the line 6—6 of Figure 3, looking in the direction of the arrows.

Figure 7 is a detail view of the main carrier chain and its method of conveying one of the side arms. This is an enlargement of a portion of Figure 6.

Figure 8 is a detail plan view of the main carrier chain and the mounting block for one of the side arms.

Figure 9 is a plan view of the pneumatic or hydraulic car shifter mechanism. This view is taken on the line 9—9, looking in the direction of the arrows, of Figure 5.

Figure 10 is a section on the line 10—10 of Figure 6 showing the means of attaching the elevator track or eyebeam to the screw blocks through which passes the elevator screw.

Figure 13 is a section on the line 13—13, looking in the direction of the arrows, of Figure 4, showing the latched mechanism in position to lift one end of a carrier arm.

Figure 14 is a similar view showing the latched mechanism detached from the carrier arm with the carrier arm resting on the main chain.

Figure 15 is a view taken on the line 15—15, looking in the direction of the arrows, of Figure 14.

Figure 16 is a perspective of the counterbalanced latch.

Figure 17 is a view taken on the line 17—17, looking in the direction of the arrows, of Figure 4, showing the main chain drive mechanism.

Figure 18 is a side elevation of the main chain, partially in section, showing one of the mounting blocks secured to the chain.

Figure 19 is a section on the line 19—19, looking in the direction of the arrows, of Figure 17.

Figure 20 is a section on the line 20—20 of Figure 4, looking in the direction of the arrows, showing the Geneva gear mechanism for actuating the main chain step by step.

Figure 21 is a diagrammatic view of the mechanism, hydraulic or pneumatic, and the electrical control mechanisms to form the sequence of operations of this invention.

Figure 22 shows a similar construction with the arms carrying the work pieces so arranged that the side arms travel a greater distance than the chain.

Figure 11:
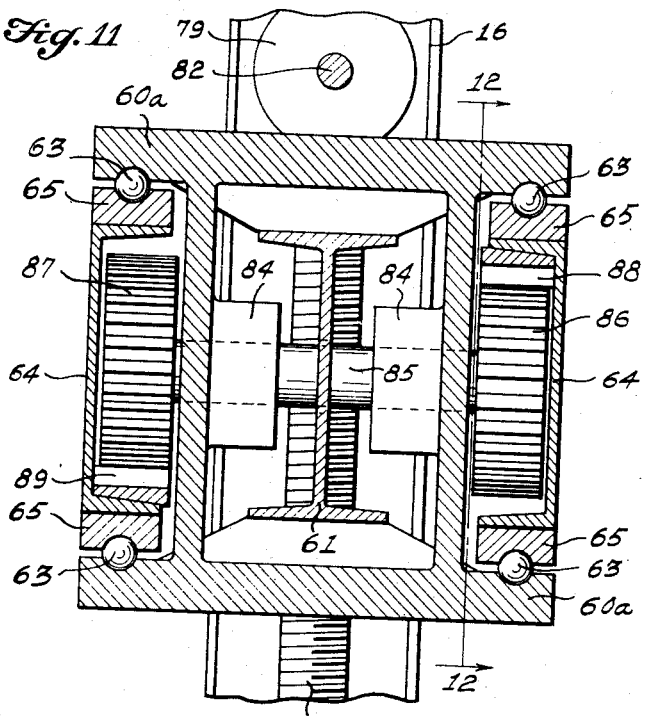
Figure 11 is a section on the line 11—11 of Figure 5 showing the gear driving mechanism, the gear interconnecting mechanism between the oppositely moving shifter cars.

Referring to the drawings in detail, 1 indicates a loading station at which point, as will be seen in Figures 1 and 4, a work rack 2 which is adapted to support a plurality of work pieces is mounted upon the outer supporting end 3 of a horizontally disposed carrier arm 4. This arm with its work pieces is transported by the main chain 5 along the top of the electric cleaner tank 6 with the work pieces immersed in the cleaner. Then the arm 4 is lifted vertically by the elevator mechanism hereinafter described, until the bottom of the rack and the work pieces are above the end of the tank 6 whereupon the arm and its rack are transported horizontally and then lowered so that the work pieces are inserted within the water dip of the tank 7. This operation of transfer is repeated over each tank so that the work pieces are successively immersed in the acid tank 8, water dip tank 9, plating tank 10, water dip tank 11, water dip tank 12 and are passed through the drier 13 to the unloading station 14.

The main chain may be driven continuously or intermittently as hereinafter described so long as it operates in synchronism with the transfer of the carrier arms from place to place on the chain. The cycle of transfer movement is indicated in Figure 2 which is a typical transfer cycle in which it takes ten seconds to elevate the carrier arm at the end of the tank, five seconds to transport it horizontally over the top of the adjacent walls of the adjacent tanks, and ten seconds to lower it so that the work pieces will be immersed in the electrolyte or the fluid of the next succeeding tank. Then it takes five seconds for the transporting car to return to its initial position ready to pick up a new arm to repeat the cycle of movement. It will be understood that this timing is only typical and a wide variety of timings is possible with this machine.

Between the tanks, when they are arranged as shown in Figure 1, there is left a narrow space designated 15. In this space is mounted the frame and associated mechanism for performing all of the operations of the transporting of the carrier arms, racks and work pieces. It will be noted that this mechanism does not overhang the tanks so that any lubricant or other foreign material dropping from the operating mechanism will not contaminate the tanks. It will be further observed that in this machine the carrier arms are transported horizontally or vertically without changing the horizontal position of the arms. It will also be noted that the machine is of the minimum height so that it can be placed in buildings having low ceilings, an important factor in the installation of these machines.

*Central frame mechanism*

This frame consists of a plurality of upright members of I beam or other sections designated 16. They may be mounted upon the floor 17 in any desired manner. These members are connected at the top by cap plates in the form of angle irons 18 and 19. On these angle irons are mounted pillow blocks 19a for supporting the elevator driving shaft 20. On the shaft are mounted the miter gears 21 engaging with the elevator screw gears 22 which are in turn carried on the elevator screws 23 which are journaled at 24 by the angle irons 18 and 19 and within the frame work 16.

This frame work 16 is provided with oppositely disposed brackets 25 on which are mounted horizontally disposed angle iron plates 26 that form horizontal platforms. These brackets 25 also support arms 27 that carry the contact rails 28 with which engage the spring press contact shoe 29 for connecting the work pieces and electrical circuit through the cable 30 on the arm 4.

Main transport chain mechanism

These arms 4 have their inner ends formed with a depending shoulder 31 and a depending flange 32 connected by a web 33 to the arm 4. The shoulder 31 has a wedge shaped surface 34. Between 34 and 32 is a recess 35 into which projects a main carrier chain pusher 36 that rides upon the main carrier chain 5 and is so engaged that the carrier arm is moved horizontally with the chain by a slight bending action. The flange 32 bears against the depending portion 36a of this pusher member. The chain itself is provided with four rollers 5a, 5b, 5c and 5d traveling between tracks 38. Thus the chain is guided in all directions. These tracks are held in position by the plate 39 and the angle iron 40.

The main chain itself is driven through a sprocket 41, shaft 42 and Geneva gear mechanism consisting of a slotted disc 50 having slots 51 engaged by the pin 52 of a plate 53 which is in turn driven by the shaft 54. This shaft extends through the gear box 55 in which there are gears driven by the motor shaft 56 of the motor 57. The control of the operation of this motor and this driving mechanism will be described hereinafter.

Elevating mechanism

The motor 58 mounted on the angle irons 18 and 19 of frame 16 drives the elevator shaft 20 and the gears 21 and 22 of which there are a number associated with this shaft. As heretofore described, this results in actuating the screws 23 of which there are an appropriate number. The screws 23 are journaled at the top in a block 24 and at the bottom in a block 59 supported on the frame work 16. On each of these screws there are mounted spaced pairs of screw blocks 60 which are attached to the upper and lower faces of a transversely extending I beam 61. This I beam extends horizontally of the machine between the screw blocks. These screw blocks are provided with lateral extensions 62 forming trackways for the balls 63 that are interposed between it and the side arm cars that are formed of the I beams 64.

These cars are provided with tracks 65 for engaging with the balls 63 carried on the extension 62 of the block 60. These I beams 64 extend horizontally throughout the length of the machine and are engaged at spaced points and supported by groups of balls associated with each track of the extension 62.

Track pick-up mechanism

These tracks when in their lowered position, before being elevated, are in the position shown in Figure 14. In that position the car 64 has not yet picked up the side arm 4. This side arm 4 is provided with an upward projecting flange 66 which is inserted between the car 64 and an overlapping finger 67 carried by the car 64. This side arm is provided with a shoulder 68 adjacent a cut-away portion 69 on the inner end of the arm. Adjacent this cutaway portion is an opening 70 in the face of the car 64 through which there can project the eccentrically weighted latching finger 71 that has a nose 72 that will project through the opening 70 and engage the surface 68 of the arm 4. This surface 68 is inclined downwardly and inwardly.

The latching finger 71 is provided with a shoulder 73 on its inner face. The finger normally shown in Figure 14 is in disengaged position. It is pivotally supported for this purpose on the pivot 74 of the bracket 75 mounted on the inside of the car 64. A counterbalancing weight 76 is also mounted on this pivot 74 and if not held in its upper position, as shown in Figure 14, it will drop down engaging the shoulder 73 and push the latching finger 71 and its nose 72 into latching position so that the side arm 4 can be elevated.

When the elevator is in its lowermost position the operation of this weight 76 is prevented by the unlatching member 77 carried on the bracket 78 which is mounted upon the plate 26. However, as soon as the elevator starts upwardly, the latching operation takes place and the inner end of the side arm is locked between the locking nose 72 of the locking finger 71 and the overlapping finger 67 which holds the inner face 78a of the side arm against the face of the car 64. The elevator then lifts the side arm in its horizontal position towards the uppermost position indicated in Figure 6.

Horizontal shifting mechanism

When the elevator has lifted the side arms and cars in their uppermost position, then the car must be shifted laterally to transport the side arms in a horizontal path from a position over the tanks into which their work pieces are to be inserted. This shifting is effected by any desired means but preferably by a hydraulic or pneumatic mechanism shown in detail in Figures 5 and 9. There is mounted upon the I beam 61 a cylinder 79 in which is a piston 80 and a piston rod 82 that is connected to the block 83 mounted on the car 64. The introduction of fluid or a gas into the cylinder on either side of the piston 80 brings about the reciprocation necessary to move the side arm to its new position and after it is lowered into its new position to return the car 64 to its initial position.

Figure 12:
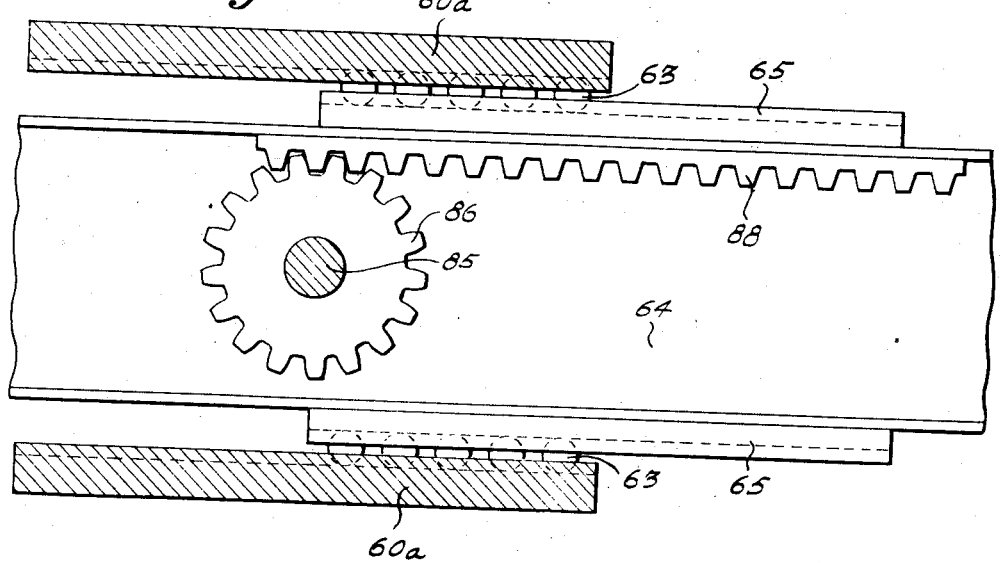
Figure 12 is a section on the line 12—12 of Figure 11.

In order to move these cars by a common mechanism, where the cars are on opposite sides of the supporting frame 16, the following interconnecting gearing is provided so that when one car is traveling in one direction the other car will travel in the opposite direction. This is shown in detail in Figures 11 and 12.

A bearing sleeve or bearing sleeves are provided at 84 in the frame 60a. Mounted in these bearings is a shaft 85 having gears 86 and 87. The gear 86 engages with the rack 88 on the car 64 on one side and the gear 87 engages with the lowering rack 89 of the oppositely disposed car 64 so that when one car is going in one direction the other car is going in the other direction, as only one car is being actuated (see Figure 9) by the cylinder 79, piston 80 and piston rod 82.

After this shifting takes place, the elevator is lowered with the car in the new position and upon being lowered the stop 77 engages the weight 76 unlatching the arm 4 from the car 64. The car 64 is then shifted back to its original position ready to pick up a new arm and the arm itself is transported by the main chain 5 along the top of the next succeeding tank. The detail of driving the main chain 5 is shown in Figures 17, 18 and 19. The driving sprocket 41 is provided with spaced teeth 90 which engage between the rollers 5b.

Figure 18 is a side elevation, partly in section, showing the chain 5 and side arm supporting block 36.

Control mechanism

The power lines 91, 92 and 93 supply the electrical energy for operating the timing mechanism, the elevating mechanism and the main chain conveyer mechanism. They also supply the power to the motor for driving the hydraulic or pneumatic pump which actuates the car in shifting it back and forth. 94 indicates a fused switch. 95 indicates a timing motor suitably connected to the sources of electrical energy through lines 96 and 97. It drives through gears 98, 99 and 100 a timing cam 101 which intermittently actuates a switch lever 102 controlling the contacts 103 and 104.

The lever is connected to the power source by the wire 105, and contact 104 is connected to the wire 106. The intermittent opening and closing of this circuit, as hereinafter explained, controls the sequence of operations in advancing the carrier arms and in transferring them one by one from tank to tank.

When these contacts 103 and 104 are engaged, this energizes solenoid 107 through contacts associated with armature 108 through the top circuit 108a and normally closed switch 115. This causes the circuit to motor 58 which operates the elevator to be closed. The three lower contacts associated with armature 107, such as 109, 110 and 111, effect this connection of the wires 112, 113 and 114 to the motor 58. This results in the motor 58 operating through the shaft 20 and the gears 21 and 22 rotating the screws 23 and elevating the elevator 61 and cars 64, with the result that the normally closed switch 115 is opened by the engagement of the elevator with the switch pin 116, thus breaking the circuit through the wires 117 and 118 with which the solenoid 107 is in circuit. This results in stopping the elevating motor.

The lateral shifting of the car 64 takes place by the elevator shifting the shifter rod 119 so as to move the valve lever 120 to admit pressure from the hydraulic pressure line 121 that is connected to a pump (not shown) to the inlet line 122 so as to force the piston 80 with its car 64 to the right hand. The arm on the elevator and car which has been elevated is thus shifted from over one tank to another. The upward movement of the elevator has resulted in closing the switch contacts 123 and 124 thereby bringing the solenoid 125 in circuit through the wires 126 and 127 that are connected to the incoming power lines 128, 129 and 130. This is effected by the solenoid moving the switch arm 131 upwardly closing the contacts 132, 133 and 134.

The motor 57 then moves the conveyer chain 5 forwardly one step. The switch member 135 closes the line 136 to the contacts 137. The other side of the circuit is connected to the switch arm 138 and wire 139. The continued operation of the motor 57 brings the pin 140 into position to open this circuit which causes the motor to stop because by that time the car 64 has moved to the right hand and the switch contacts 123 and 124 have already opened under the impulse of the spring 141. The chain is so timed as to stop before the arm is lowered upon the chain as hereinafter described.

When the car 64 moves to the right hand, it closes the switch contacts 142 and 143 thereby again bringing motor 58 in circuit to cause it to turn to lower the elevator. The motor 58 is now turning in the reverse direction. The closing of this circuit brings solenoid 144 in circuit, closing switches 145, 146 and 147. Solenoid 107 has been deenergized so that its switches 109, 110 and 111 have opened. The elevator then descends until it opens the switch contacts 148 and 149 by compressing the spring 150. It does this through engaging the switch pin 151, thus bringing the motor to rest.

During this interval of time the chain 5 has advanced the same distance that the car has also advanced in the same direction so that the arm is eventually set down on the chain at substantially the same place from which it was lifted. The movement of the arm on three sides of the rectangle has effected the quick transfer over the ends of the tanks. The lowering of the elevator brings about a shifting of the lever 120 and the valve 120a so as to apply the hydraulic pressure through pipe 152 to cause the car to return to its initial position. This is effected by the shifting of the lever 120 through the shifter rod 119 carried with the elevator. 153 designates the outlet to the pump.

It will be further understood that the elevator may be controlled hydraulically or pneumatically instead of electrically. The main chain may be moved step by step hydraulically or pneumatically. The car may be operated electrically. I have found, however, that the preferable actuating means are those employed as the car, when operated hydraulically or pneumatically, is yieldingly brought to its home positions without shock, while at the same time permitting of great rapidity of movement. As it is desirable to have the minimum time of transfer to reduce the effect of oxidation, the speed of transfer is important.

In all cases it is not necessary that the carriers that are lifted from the chain move the same distance as the chain during the transfer operation. In this machine the carrier may move ahead two or more carrier spaces while the chain moves only one space. The result of this is to leave one empty space on the end of the chain at each transfer point. The carriers always jump over this space. The chain length is equal to the carrier spacing multiplied by the number of carriers plus the number of transfers.

There are two advantages to this set-ahead method. With the continuous moving chain, the carrier may be transferred at a speed greater than the speed of the chain, thereby reducing the time of exposure to the air. The distance between the carriers on either side of the barrier is greater than the distance between adjacent carriers in a tank, thereby preventing interference between work pieces and the barrier. This arrangement eliminates having so much space between adjacent carriers when the carrier is very long, which might otherwise occur where difficulties arise in straddling the barrier. The problem of unduly long exposure is taken care of on side arm conveyers by the use of an intermittent movement of the chain.

It will be understood that I desire to comprehend within my invention such modifications as come within the scope of the claims and the invention.

Having thus fully described my invention what I claim as new and desire to secure by Letters Patent is:

1. An electro-processing machine comprising a conveyer chain, a series of processing tanks adjacent to the path of said conveyer chain, a series of spaced arms detachably engaged with said chain and extending over said tanks, a vertically reciprocating elevator mechanism having a horizontally shiftable portion mounted for reciprocation thereon, said elevator being adapted to lift one or more of said arms as they are conveyed along out of engagement with said chain and subsequently replace them in engagement with said chain, means associated therewith to move said elevator and lifted arms forward in the direction of travel of said conveyer chain while said arms are in an elevated position, and means for moving said conveyer chain while the elevator and one or more of said arms are in an elevated position.

2. In an electroprocessing machine having a plurality of tanks, a main conveyer means having a plurality of arms detachably mounted thereon, an elevator, a car on said elevator adapted to have horizontal movement thereon, means on said car for picking up one of said arms and elevating it, means associated therewith for moving the car to move the arm on the elevator a predetermined horizontal distance and means associated with the elevator for lowering said arm onto said conveyer means.

3. In an electroprocessing machine having a plurality of tanks, a main conveyer means having a plurality of arms detachably mounted thereon, an elevator, a car on said elevator adapted to have horizontal movement thereon, means on said car for picking up one of said arms and elevating it, means associated therewith for moving the car to move the arm on the elevator a predetermined horizontal distance, means associated with the elevator for lowering said arm onto said conveyer means and means controlled by said elevator for moving said main conveyer means the same horizontal distance as the horizontal movement of said car and arm.

4. In an electroprocessing machine having a plurality of tanks, a main conveyer means having a plurality of arms detachably mounted thereon, an elevator, a car on said elevator adapted to have horizontal movement thereon, means on said car for picking up one of said arms and elevating it, means associated therewith for moving the car to move the arm on the elevator a predetermined horizontal distance, means associated with the elevator for lowering said arm onto said conveyer means, means controlled by said elevator for moving said main conveyer means the same horizontal distance as the horizontal movement of said car and arm and means controlled by said car for lowering said arm.

5. In an electroprocessing machine having a plurality of tanks, a main conveyer means having a plurality of arms detachably mounted thereon, an elevator, a car on said elevator adapted to have horizontal movement thereon, means on said car for picking up one of said arms and elevating it, means associated therewith for moving the car to move the arm on the elevator a predetermined horizontal distance, means associated with the elevator for lowering said arm onto said conveyer means, means controlled by said elevator for moving said main conveyer means the same horizontal distance as the horizontal movement of said car and arm, means controlled by said car for lowering said arm and means controlled by said elevator for returning said car to its initial position.

6. In an electroprocessing machine having a plurality of tanks, a timing means, an elevator, a car thereon, a main conveyer chain having a plurality of detachably mounted arms thereon, means for driving said chain step by step, means controlled by said timing means for starting the upward movement of said elevator whereby the car picks up an arm, means controlled by the elevator in its uppermost position for initiating the movement of the conveyer actuating means, means associated with conveyer actuating means for terminating its movement before the return of the arm to the chain conveyer, means for moving said car on the elevator when the elevator reaches its uppermost position, means controlled by said car for reversing the elevator to lower it, means controlled by the elevator for stopping its lowering movement when it has redeposited the arm on the main conveyer chain.

7. In an electroprocessing machine having a plurality of tanks, a timing means, an elevator, a car thereon, a main conveyer chain having a plurality of detachably mounted arms thereon, means for driving said chain step by step, means controlled by said timing means for startng the upward movement of said elevator whereby the car picks up an arm, means controlled by the elevator in its uppermost position for initiating the movement of the conveyer actuating means, means associated with conveyer actuating means for terminating its movement before the return of the arm to the chain conveyer, means for moving said car on the elevator when the elevator reaches its uppermost position, means controlled by said car for reversing the elevator to lower it, means controlled by the elevator for stopping its lowering movement when it has redeposited the arm on the main conveyer chain and means on the elevator when it is lowered to return the car to its initial position after having deposited the arm on the chain.

8. In an electroprocessing machine having a plurality of adjacent tanks, a common conveyer chain adjacent the top of said tanks having a plurality of arms detachably mounted thereon extending over said tanks, an electrically operated timing means, an elevator alongside said tanks, a car on said elevator, a reversible motor adapted to be brought into said circuit by said timing means for moving said elevator upwardly, a motor for moving said chain, means for bringing said motor in circuit when the elevator reaches its uppermost position and means for rendering the elevator motor inoperative, hydraulic means actuated by said elevator for moving the car thereon, means actuated by said car for bringing the elevator motor in circuit and reversing it to lower the elevator, means actuated by said elevator for stopping it at the bottom of its movement and means actuated by said elevator for reversing said hydraulic means to return the car to its initial position.

9. In an electroprocessing machine having a plurality of adjacent tanks, a common conveyer chain adjacent the top of said tanks having a plurality of arms detachably mounted thereon extending over said tanks, an electrically operated timing means, an elevator alongside said tanks, a car on said elevator, a reversible motor adapted to be brought into said circuit by said timing means for moving said elevator upwardly, a motor for moving said chain, means for bringing said motor in circuit when the elevator reaches its uppermost position and means for rendering the elevator motor inoperative, hydraulic means actuated by said elevator for moving the car thereon, means actuated by said car for bringing the elevator motor in circuit and reversing it to lower the elevator, means actuated by said elevator for stopping it at the bottom of its movement, means actuated by said elevator for reversing said hydraulic means to return the car to its initial position and means associated with said motor conveyer chain driving means for stopping said motor and chain before the elevator reaches its lowermost position.

10. In an electroprocessing machine, tanks, a transfer mechanism alongside said tanks comprising an elevator, a car thereon adapted to reciprocate on the elevator parallel to said tanks and means for detachably attaching an arm to said car, said arm extending transversely of said tanks and over them.

11. In an electroprocessing machine, tanks, a transfer mechanism comprising spaced elevator members having spaced elevating and lowering screws alongside said tanks, means for actuating said screws, a car carried on said elevator members parallel to said tanks and adapted to carry a plurality of work piece arms, hydraulic means for actuating said car in its reciprocation on the elevator and timing means associated with the elevator according to its elevation for controlling the movement of the car, and work piece arms carried on said car, said arms extending transversely over said tanks.

12. In an electroprocessing machine, tanks, a transfer mechanism comprising spaced elevator members having spaced elevating and lowering screws alongside said tanks, means for actuating said screws, a car carried on said elevator members parallel to said tanks and adapted to carry a plurality of work piece arms, hydraulic means for actuating said car in its reciprocation on the elevator, timing means associated with the elevator according to its elevation for controlling the movement of the car and means associated with the elevator for controlling the movement thereof according to its position, said means being so arranged that a plurality of arms are lifted by said car and elevator and the car and carrier chain are then shifted together laterally in the same direction to the same degree whereupon said arms are lowered to the chain by said elevator.

13. In an electroprocessing machine, a transfer mechanism for work piece carrying arms comprising an elevator, a reciprocating car mounted thereon, means to detachably lock an arm on said car prior to and during elevation and transport with the car and lowering by the elevator and means adapted to unlock said arm from said car upon the return of the elevator to its lowermost position.

14. In an electroprocessing machine, a transfer mechanism for work piece carrying arms comprising an elevator, a reciprocating car mounted thereon, means to detachably lock an arm on said car prior to and during elevation and transport with the car and lowering by the elevator, means adapted to unlock said arm from said car upon the return of the elevator to its lowermost position, a conveyer chain adapted to detachably convey said arm and means to move said chain while the arm is detached from it the same horizontal distance through which the arm is conveyed by the car.

15. In an electroprocessing machine, a transfer mechanism for work piece carrying arms comprising an elevator, a reciprocating car mounted thereon, means to detachably lock an arm on said car prior to and during elevation and transport with the car and lowering by the elevator, means adapted to unlock said arm from said car upon the return of the elevator to its lowermost position, a conveyer chain adapted to detachably convey said arm, means to move said chain while the arm is detached from it the same horizontal distance through which the arm is conveyed by the car and means for timing said movements in synchronism.

16. In an electroprocessing machine, an arm transfer mechanism comprising an elevator electrically operated, means for raising and lowering said elevator, a reciprocating car thereon for detachably picking up a work piece arm, hydraulically operated means for reciprocating said car, means on the car for controlling at least a part of the movements of the elevator.

17. In an electroprocessing machine, an arm transfer mechanism comprising an elevator electrically operated, means for raising and lowering said elevator, a reciprocating car thereon for detachably picking up a work piece arm, hydraulically operated means for reciprocating said car, means on the car for controlling at least a part of the movements of the elevator and means on the elevator for controlling at least a part of the movements of the car.

18. In an electroprocessing machine, an arm transfer mechanism comprising an elevator electrically operated, means for raising and lowering said elevator, a reciprocating car thereon for detachably picking up a work piece arm, hydraulically operated means for reciprocating said car, means on the car for controlling at least a part of the movements of the elevator, means on the elevator for controlling at least a part of the movements of the car, a conveyer chain for conveying said arm, and means associated with the elevator for controlling at least a part of the movement of the conveyer chain.

19. In an electroprocessing machine having a work piece arm transfer apparatus for transferring the arm from over one tank to another, an elevator having means to raise and lower it, a car thereon having means to reciprocate it, means on the car for detachably locking an arm thereto and means associated therewith for holding said locking means inoperative until the elevator moves upwardly and of rendering said locking means inoperative when said elevator has moved downwardly a predetermined amount.

20. In an electroprocessing machine having a work piece arm transfer apparatus for transferring the arm from over one tank to another, an elevator having means to raise and lower it, a car thereon having means to reciprocate it, means on the car for detachably locking an arm thereto and means associated therewith for holding said locking means inoperative until the elevator moves upwardly and of rendering said locking means inoperative when said elevator has moved downwardly a predetermined amount, said means comprising a pivoted latching finger carried by said car and a stationary clamping finger carried by said car both adapted to engage opposite parts of said arm, a weight for forcing said latching finger into latching position, said latching finger being so arranged as to remain in unlatched position until some weight actuates it.

21. In an electroprocessing machine, a plurality of tanks arranged in a succession of tanks in parallel relationship, a work conveying appratus located between said tanks comprising a unitary conveyer chain, a plurality of spaced arms detachably mounted thereon extending over said tanks, a common elevator having oppositely disposed arms projecting over the opposite series of tanks, cars mounted on opposite sides of said elevator, means on said cars for detachably attaching oppositely disposed arms to said respective cars and means of actuating said oppositely disposed cars when the arms are so elevated to move the arms in opposite directions simultaneously.

22. In an electroprocessing machine, a plurality of tanks arranged in a succession of tanks in parallel relationship, a work conveying apparatus located between said tanks comprising a unitary conveyer chain, a plurality of spaced arms detachably mounted thereon extending over said tanks, a common elevator having oppositely disposed arms projecting over the opposite series of tanks, cars mounted on opposite sides of said elevator, means on said cars for detachably attaching oppositely disposed arms to said respective cars, means of actuating said oppositely disposed cars when the arms are so elevated to move the arms in opposite directions simultaneously and means associated with said elevator for moving said conveyer chain the same distance that said arms are moved horizontally whereby the arms are replaced upon the conveyer chain at the same points from which they were removed from it.

23. In an electroprocessing machine, two series of tanks arranged in parallel with a space therebetween, conveyer mechanism located between said tanks comprising a single chain the sides of which move adjacent the sides of said tanks, a plurality of detachable horizontally disposed work conveying arms mounted on said chain at predetermined intervals, a common elevator for said arms, a plurality of cars mounted on said elevator arranged in pairs on opposite sides of the elevator, means on said arms for detachably locking through the inner end of an arm, means for intermittently driving step by step said conveyer chain, means for moving said elevator up and down, means for reciprocating said cars and a common control means whereby the arms that are to be lifted on opposite sides of the conveyer are lifted and lowered simultaneously and are shifted by said cars in the upper position of the conveyer horizontally simultaneously and means of timing the movement of said conveyer chain with the movement of said arms so that it will move when the arms are removed therefrom the same horizontal distance that the arms move.

24. In an electroprocessing machine, a series of successive tanks arranged in parallel with a space therebetween, a conveyer frame work located therebetween, a plurality of spaced elevating screws therein, a horizontally disposed elevator mounted on said screws, a common conveyer chain located adjacent the inner edges of said tanks and between said tanks, a plurality of detachable horizontally disposed work piece conveying arms mounted on said chain, a plurality of reciprocating cars adapted to detachably pick up said arms, said cars being mounted on said elevator, a common operating means for said screws, means for moving said conveyer chain step by step, means associated with said chain for preventing said cars from locking with said arms when the elevator is in its lowermost position and means on said cars for locking an arm thereto when the car is a predetermined elevation above the chain whereby said arms may be transported by the chain, elevator and car, but are always maintained in their horizontal position during said movement.

25. A machine for conveying and subjecting materials to processing treatment comprising a conveyer chain, a series of processing tanks arranged adjacent to the path of said conveyer chain, a series of spaced arms detachably engaging with said chain and extending over said tanks, a vertically movable elevator mechanism having a horizontally shiftable portion mounted for reciprocation thereon, said elevator being adapted to lift certain of said spaced arms out of engagement with said chain and subsequently replace them in engagement with said chain, means associated therewith to move said elevator and lifted arms in the direction of travel of said conveyer chain while said arms are in an elevated position, and means for intermittently moving said conveyer chain.

26. A machine for conveying and subjecting materials to processing treatment comprising a conveyer chain, a series of processing tanks arranged adjacent to the path of said conveyer chain, a series of spaced arms detachably engaging with said chain and extending over said tanks, a vertically movable elevator mechanism having a horizontally shiftable portion mounted for reciprocation thereon, said elevator being adapted to lift one or more of said arms out of engagement with said chain and subsequently replace them in engagement with said chain, means associated therewith to move said elevator and lifted arms in the direction of travel of said conveyer chain while said arms are in an elevated position, and means for intermittently moving said conveyer chain only while the elevator and one or more of said arms are in an elevated position.

27. In a machine for conveying and subjecting materials to processing treatment, a plurality of tanks, a work piece carrier arm, a transfer mechanism arranged above said tanks comprising an elevator, a car thereon adapted to reciprocate on the elevator parallel to said tanks and means for detachably supporting said work piece carrier arm on said car, said arm extending transversely of said tanks and over them.

GUERIN TODD.